No. 620,115. Patented Feb. 28, 1899.
F. A. FISHER.
BICYCLE ATTACHMENT.
(Application filed Nov. 20, 1897.)
(No Model.) 2 Sheets—Sheet 1.
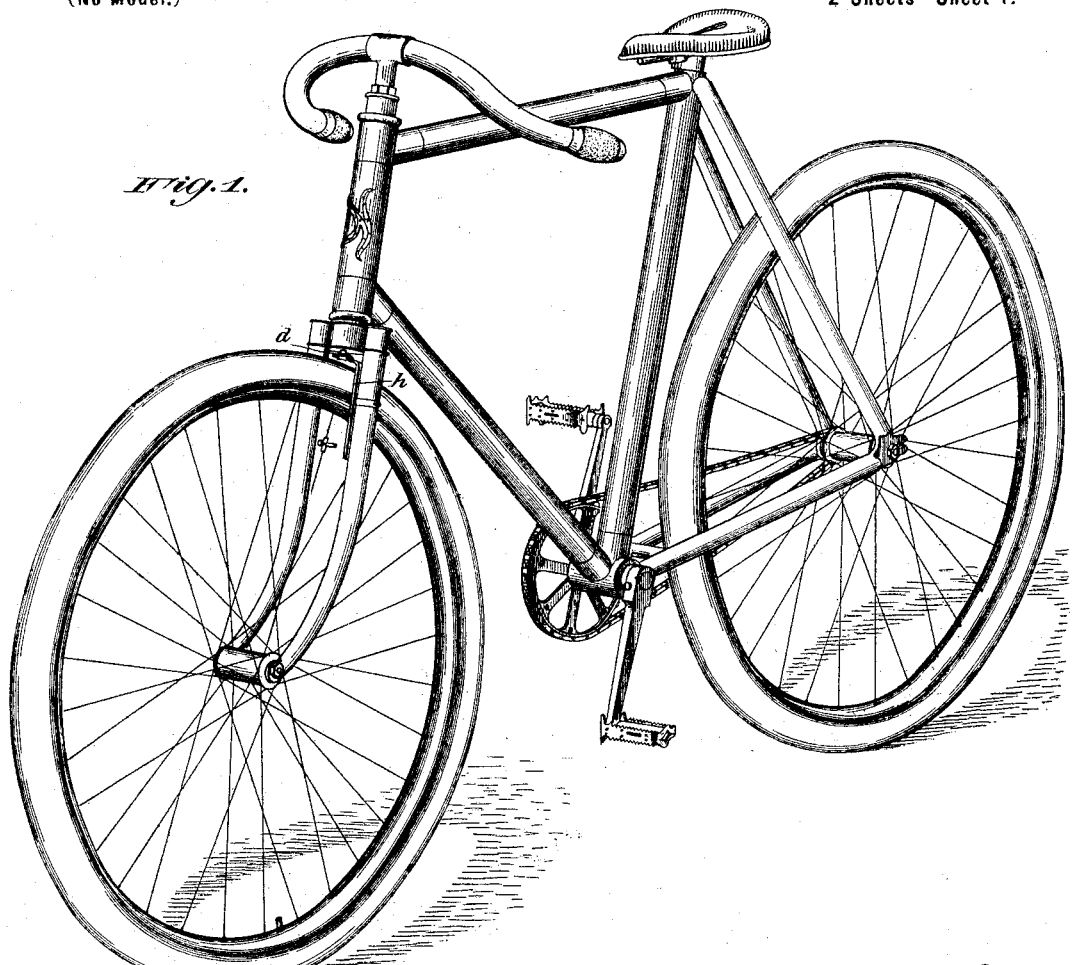
Fig. 1.
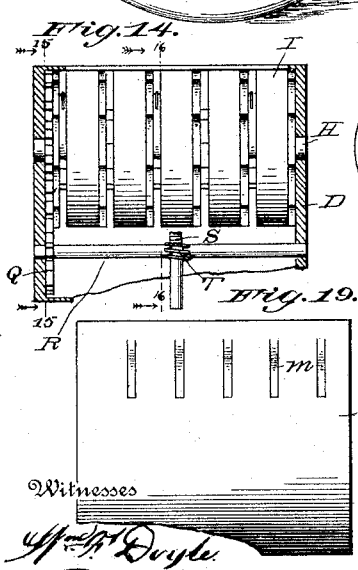
Fig. 14.
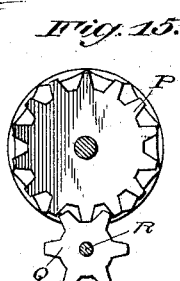
Fig. 15.
Fig. 16.
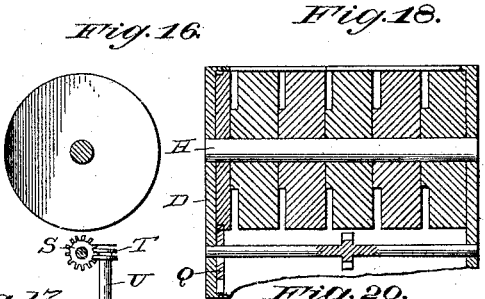
Fig. 18.
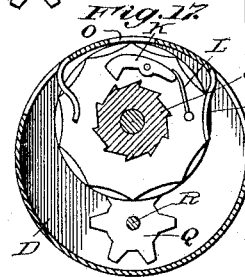
Fig. 19.
Fig. 17.
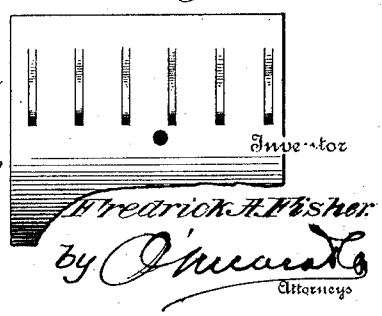
Fig. 20.
Witnesses
Inventor
Fredrick A. Fisher.
by O'Meara
Attorneys
THE NORRIS PETERS CO., PHOTO-LITHO., WASHINGTON, D. C.

No. 620,115. Patented Feb. 28, 1899.
F. A. FISHER.
BICYCLE ATTACHMENT.
(Application filed Nov. 20, 1897.)
(No Model.) 2 Sheets—Sheet 2.
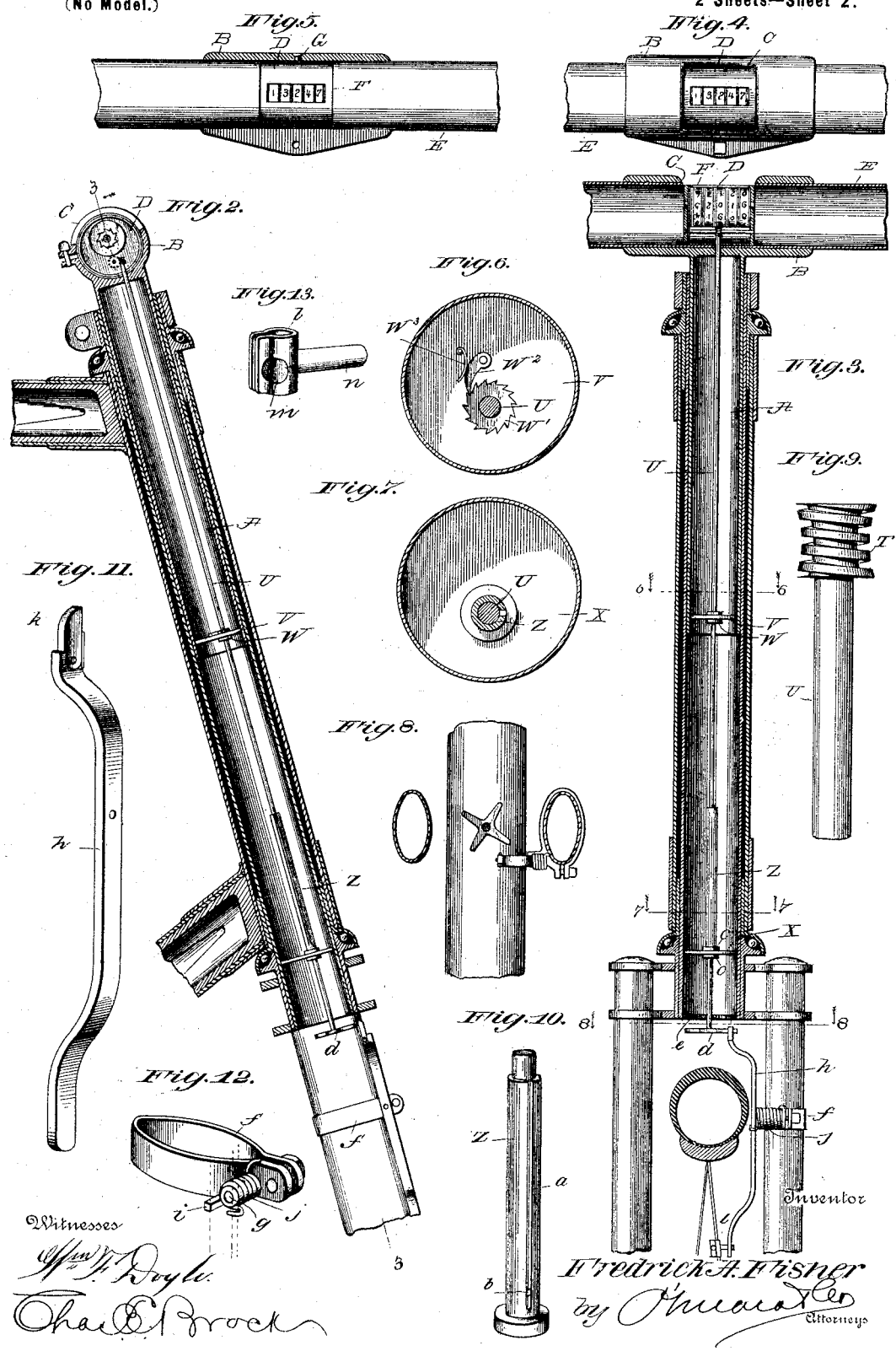

UNITED STATES PATENT OFFICE.

FREDERICK A. FISHER, OF PROVINCETOWN, MASSACHUSETTS, ASSIGNOR, BY DIRECT AND MESNE ASSIGNMENTS, OF THREE-FOURTHS TO WILLIAM B. BANGS, JOHN D. ADAMS, AND HENRY A. WIPPICH, OF SAME PLACE.

BICYCLE ATTACHMENT.

SPECIFICATION forming part of Letters Patent No. 620,115, dated February 28, 1899.

Application filed November 20, 1897. Serial No. 659,313. (No model.)

*To all whom it may concern:*

Be it known that I, FREDERICK A. FISHER, residing at Provincetown, in the county of Barnstable and State of Massachusetts, have invented a new and useful Bicycle Attachment, of which the following is a specification.

This invention relates generally to improvements in bicycle attachments, and particularly to cyclometers.

The object is to provide an improved construction of cyclometer which may be positioned in the handle-bars to be in view of the rider at all times while riding, so that the distance indicated thereby may be readily ascertained without dismounting from the wheel.

A further object is to provide a mechanism for operating said cyclometer, said mechanism being so arranged as to not interfere with the vertical adjustment of the handle-bar.

With the above objects in view the invention consists of a cyclometer positioned in the handle-bars and comprising a series of indicating-disks operated by a shaft having a gear-wheel thereon, and a shaft having a worm-gear upon its upper end which engages said gear-wheel, said shaft extending downward through the stem of the handle-bars and the tube of the front forks and having a sliding connection with a second shaft mounted in the lower end of said tube and carrying a star-wheel on the lower end thereof, which is engaged by a lever intermediately pivoted to the front fork and engaged at its lower end by a striker secured to one of the spokes of the front wheel.

The invention further consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, having reference to the accompanying drawings, forming part of this specification, in which—

Figure 1 is a perspective view of a bicycle, showing my invention applied thereto. Fig. 2 is a vertical longitudinal sectional view thereof. Fig. 3 is a similar view taken on the line 3 3 of Fig. 2, looking in the direction of the arrow. Fig. 4 is a top plan view of a portion of the handle-bars, showing the cyclometer positioned therein. Fig. 5 is a similar view showing the clamping-collar in section. Fig. 6 is a transverse section on the line 6 6 of Fig. 3. Fig. 7 is a similar view on the line 7 7 of Fig. 3. Fig. 8 is also a transverse section on the line 8 8 of Fig. 3. Fig. 9 is a detail view of the operating-shaft, showing the worm-gear upon the outer end thereof. Fig. 10 is a detail view showing the sliding section of the operating-shaft, with the shaft mounted in the lower end of the front fork of the tube. Fig. 11 is a detail perspective view of the operating-lever for actuating the operating-shaft. Fig. 12 is a perspective view of the clamp for pivotally securing said shaft to the front fork. Fig. 13 is a perspective view of the striker carried by the wheel. Fig. 14 is a vertical sectional view through the casing in which the cyclometer is mounted, showing the indicating-disks in elevation. Fig. 15 is a sectional view on the line 15 15 of Fig. 14. Fig. 16 is a similar view on the line 16 16 of Fig. 14. Fig. 17 is a transverse section on the line 16 16 of Fig. 14, looking in the opposite direction to that of Fig. 16. Fig. 18 is a vertical longitudinal sectional view of the cyclometer. Fig. 19 is a side elevation thereof. Fig. 20 is a similar view of the opposite side.

Like letters of reference mark the same parts wherever they occur in the various figures of the drawings.

Referring to the accompanying drawings, A indicates the stem of the handle-bar, having the clamp B formed at the upper end thereof, said clamp having an opening C in its upper surface, through which the cyclometer-casing D may be readily inserted or withdrawn. The handle-bars E are adapted to be secured in position upon the stem by the clamp and are adjustable thereon, said handle-bars provided with an opening F in the upper surface thereof to register with the opening C in the clamp, so that the cyclometer-casing may be readily positioned therein, the same being secured by a screw G, passing through the clamp and the handle-bars and engaging the casing.

The cyclometer consists of the casing D, having a shaft H secured therein, upon which a plurality of indicating-disks I are mounted and rotatable, each of said disks having a ratchet-wheel J secured upon one of its faces and a dog K upon its opposite face. Thus the dog upon one of the disks is in position to engage the ratchet of the adjacent disk, the same being normally held out of engagement by a spring L. Tongues M are struck out of the casing and bent inwardly, one of said tongues engaging the flat surfaces N, formed about the periphery of the indicating-disks and acting as a stop to hold each numeral upon the disk before the slot O of the casing until said disk is moved. Secured to the face of the end disk is a gear-wheel P, and engaging the same is a wheel Q, carried by a shaft R, which is rotatable in the cyclometer-casing beneath the indicating-disks. When said shaft is rotated, the end disk is rotated, and when said end disk is rotated a certain distance the dog K, by engagement with the tongue M, will be forced into engagement with the ratchet-wheel of the adjacent disk and rotate the same until said dog disengages the tongue M. By placing the dogs at different positions upon the respective disks the former are caused to rotate to indicate the number of miles ridden from one to one or ten thousand.

Upon the shaft R, at the center thereof, is a gear-wheel S, which is engaged by a worm-gear T, formed on the upper end of an operating-shaft U, said shaft extending downwardly through the handle-bar stem and extending through a washer V, secured in the handle-bar stem, at the lower end thereof, and having a collar W on one side of said washer and a ratchet W' on the other side, said ratchet-wheel being engaged by a dog W², which is held in engagement therewith by a spring W³, secured to the washer. Thus the shaft is held from rotation in a reverse direction. A washer X is secured in the tube of the front fork adjacent its lower end, and extending through said washer is a second shaft Y or lower section of the operating-shaft, the same having a tubular portion Z at its upper end, which is slotted longitudinally at $a$ to receive a pin $b$, carried by the lower end of the upper shaft-section, said slot being open at its upper end, so that the upper section of the shaft may be readily withdrawn therefrom when it is desired to remove the handle-bars. The lower shaft-section is held in position by the collars $c$, positioned on opposite sides of the washer X, and carries at its lower end the star-wheel $d$. A washer $e$, of felt or any other desired material, is positioned in the front-fork tube, at the lower end thereof, and serves to prevent the passage of dirt or dust therethrough.

$f$ is a clamp embracing one of the forks and having a pivotal pin $g$ to receive the operating-lever $h$, which is intermediately pivoted therein, and a stop $i$ to prevent the movement of said lever in a reverse direction. A spring $j$ is coiled about the pivotal pin and engages said lever to return the same to its normal position after it has been operated. The lever $h$ is curved inwardly at its upper and lower ends, the upper end having a spring-held dog $k$, which is adapted to engage the star-wheel and operate the same, the lower end of the lever being engaged by a striker carried by one of the spokes of the wheel, said striker consisting of the clamp $l$, having a set-screw $m$ and the pin or projection $n$, which engages the lower end of the operating-lever as the wheel is rotated.

As the wheel rotates, the striker engages the lower end of the operating-lever, moving the upper end of the same and causing the operating-shaft to rotate, which actuates the shaft R in the cyclometer-casing and effects the movement of the indicating-disks.

The handle-bar may be adjusted vertically without disturbing the arrangement of the parts through the medium of the sectional operating-shaft, one section being carried by the handle-bars and the other by the tube of the front fork and having a sliding connection. The cyclometer-face may also be quickly and readily removed from the handle-bars by taking out the securing-screw which is carried by the clamp. By having the opening in the handle-bars considerably larger than the slot or opening in the cyclometer-casing said handle-bars may be adjusted without closing said cyclometer-opening and shutting off the view of the indicating-disks.

Through the medium of the shaft having the pinion thereon and the worm-gear of the operating-shaft the construction of the cyclometer is simplified, it being operated from its central point without the use of separate gears.

From the above description it will be seen that I have produced a very simple construction of cyclometer and mechanism for operating the same and have positioned the cyclometer in the handle-bars where it is at all times within view of the rider while riding the wheel, so that the distance ridden may be readily ascertained without dismounting from the wheel for that purpose.

While I have illustrated and described the best means now known to me for carrying out my invention, I do not wish to be understood as restricting myself to the exact details of construction shown and described, but hold that any slight changes or variations such as might suggest themselves to the ordinary mechanic will properly fall within the limit and scope of my invention.

Having thus fully described my invention, what I claim as new, and desire to secure by Letters Patent of the United States, is—

1. In a bicycle, the combination with the handle-bars, of a cyclometer carried thereby, an operating-shaft therefor extending through the stem of the handle-bars and the tube of the front forks and having a star-wheel on its lower end, a clamp secured to the front forks and having a stop and pivotal pin, an operating-lever pivotally mounted intermediate its ends upon said pin and carrying a dog at its upper end which engages the star-wheel, a spring coiled about said pivotal pin and engaging the operating-lever, and a striker carried by the wheel for engaging the lower end of the lever, substantially as set forth.

2. In a bicycle, the combination with the handle-bars, of a cyclometer carried thereby, a sectional operating-shaft for actuating the cyclometer, one of the sections being mounted in the handle-bar stem and the other section in the tube of the front forks, a cross-piece in said handle-bar stem to which the lower end of the upper section of said shaft fastens, a pawl carried by said cross-piece, a ratchet-wheel carried by the shaft which is engaged by the pawl, said sections having a sliding connection, and means actuated by the wheel for operating the shaft, substantially as set forth.

FREDERICK A. FISHER.

Witnesses:
E. C. McRitchie,
M. C. Atwood.